Nov. 3, 1925.
J. A. CUNNINGHAM
1,560,412
AUTOMOBILE SWITCH MOUNTING
Filed May 24, 1923
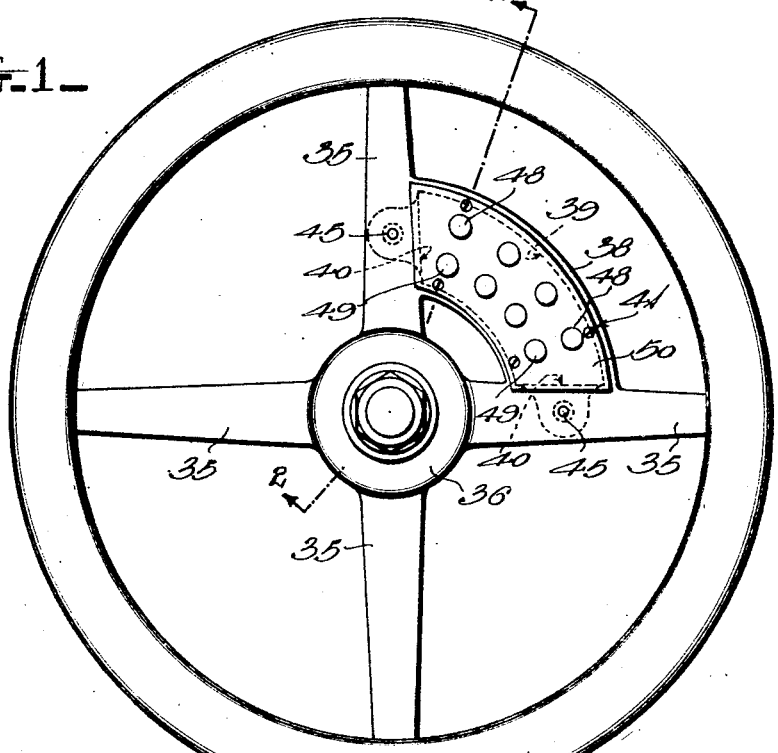
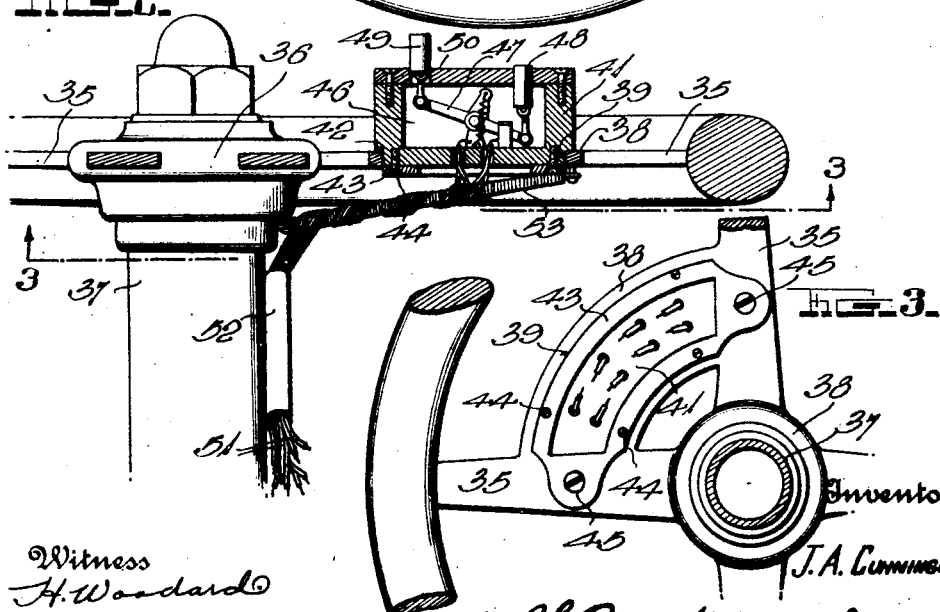
Witness
H. Woodard
Inventor
J. A. Cunningham
By H. R. Wilson & Co.
Attorneys Patented Nov. 3, 1925.

1,560,412

UNITED STATES PATENT OFFICE.

JOHN A. CUNNINGHAM, OF BETHLEHEM, PENNSYLVANIA.

AUTOMOBILE SWITCH MOUNTING.

Application filed May 24, 1923. Serial No. 641,192.

*To all whom it may concern:*

Be it known that I, JOHN A. CUNNINGHAM, a citizen of the United States, residing at Bethlehem, in the county of Northampton and State of Pennsylvania, have invented certain new and useful Improvements in Automobile Switch Mountings; and I do declare the following to be a full, clear, and exact description of the invention, such as will enable others skilled in the art to which it appertains to make and use the same.

My invention relates to switches used on automobiles for numerous purposes, and the principal object is to provide a unique association of parts for mounting one or more controlling switches for signal-lights, tail-lights, head-lights, horns, and the like, upon the steering wheel of the machine, so that the switch or switches can be easily operated without the necessity of the driver removing either hand from said wheel.

A plurality of wires are necessarily connected with the switches on the steering wheel and it is a further object of the invention to provide unique means for maintaining the necessary amount of slack in said wires to permit free turning of the steering wheel, and to support the slack portions of the wires against drooping in the operator's way.

With the foregoing in view, the invention resides in the novel subject matter hereinafter described and claimed, the description being supplemented by the accompanying drawing.

Figure 1 is a plan view of a steering wheel and a plurality of switches mounted thereon in accordance with the invention.

Figure 2 is a sectional view on line 2—2 of Fig. 1.

Figure 3 is a sectional view cut substantially on line 3—3 of Fig. 2.

In these views, a steering wheel is shown having a plurality of radiating spokes 35 extending from its hub 36 which is mounted on the usual steering column 37. Two of these spokes are connected by an integral arcuate web 38 having an arcuate opening 39 whose end walls 40 may well be formed by the edges of said two spokes. An appropriate switch-carrying block 41, preferably formed of insulating material, is reduced adjacent its bottom and has its reduced portion snugly received in the opening 39, the reduction in size of said block, serving to provide a continuous shoulder 42 thereon which contacts with the upper sides of the web 38 and spokes 35 to which said web is connected. An elongated plate 43 is secured by screws or the like 44 to the lower side of the carrying block 41 and the ends of said plate extend beyond the web 38 and are secured by screws or the like 45 to the adjacent spokes 35 and it will thus be seen that the carrying block 41 is rigidly held in place upon the steering wheel.

Block 41 is recessed as at 46 and contains a suitable number of appropriate switches 47, each of which preferably has one button 48 for closing it and another button 49 by means of which it may be opened, the several buttons being passed through openings in a cover plate 50 secured to the block 41.

The wires 51 through which the current passes when the switches 47 are closed, may well extend through a suitable conduit 52 at the side of the steering column 37 and sufficient slack is left in said wires between the upper end of the conduit and the switch-carrying block 41, to permit the necssary turning of the steering wheel. To prevent this slack however from permitting the wires to droop, I preferably wind them around a coiled spring 53 anchored at one end to the steering column 37 and connected at its other end to the steering wheel. This spring and the portions of the wires around the same may be elastic covered if desired.

Attention may here be directed to the fact that a switch or switches mounted in accord with the present invention, may be used for any desired purpose on an automobile, for instance, to operate a traffice signal, to control tail-lights or head-lights, or to operate a horn, and the particular form of switch shown, is of great advantage for operating a horn, as when it is once turned on, the horn will continue to operate until the switch is turned off, and it is not necessary for the driver of the machine to hold his hand continually on the switch as long as it is desired to blow the horn. Thus, both hands are free for steering, shifting gear, etc., and at the same time, the horn may be blown.

From the foregoing, taken in connection with the accompanying drawings, it will be seen that simple and inexpensive arrangements have been provided for carrying out the objects of the invention and it will be understood that within the scope of the appended claims, numerous minor changes may be made.

I claim:

1. An automobile steering wheel comprising the usual hub and spokes and having an integral web connecting two of said spokes, said web having an opening, a switch carrying member having a portion snugly seated in said opening, and means securing said carrying member in said opening for movement bodily with the wheel.

2. An automobile steering wheel having an integral web connecting two of its radial spokes, said web having an opening, a switch carrying member having a portion snugly seated in said opening, a plate under said web, and connecting means between said plate and said carrying member to secure the latter in place, said member having a shoulder held tightly against the upper side of said web by said plate and connecting means.

3. The combination with an automobile steering wheel having radial spokes; of a segmental switch carrying member extending between two of said spokes and abutting the edges of the latter to hold it against circumferential movement, a plate under said member and extending beyond the ends thereof into contact with the lower sides of said two spokes, means securing said plate to said member, and means securing the projecting ends of said plate to said two spokes.

4. The combination with an automobile steering wheel, a switch thereon, and wires leading from said switch; of a coiled spring about which said wires are coiled, said spring being anchored at one end to the wheel and at its other end to the steering column on which the wheel is mounted.

In testimony whereof I have hereunto affixed my signature.

JOHN A. CUNNINGHAM.